United States Patent
Seo et al.

(10) Patent No.: US 10,618,370 B2
(45) Date of Patent: Apr. 14, 2020

(54) ACTIVE ROLL STABILIZER

(71) Applicant: MANDO CORPORATION, Gyeonggi-do (KR)

(72) Inventors: Jae Man Seo, Gyeonggi-do (KR); Jun Ho Seong, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 68 days.

(21) Appl. No.: 15/693,432

(22) Filed: Aug. 31, 2017

(65) Prior Publication Data

US 2018/0065441 A1   Mar. 8, 2018

(30) Foreign Application Priority Data

Sep. 2, 2016   (KR) ................. 10-2016-0113239
Sep. 2, 2016   (KR) ................. 10-2016-0113258

(51) Int. Cl.
   *B60G 21/055*   (2006.01)
   *B60G 17/015*   (2006.01)

(52) U.S. Cl.
   CPC ..... *B60G 21/0555* (2013.01); *B60G 17/0157* (2013.01); *B60G 2202/42* (2013.01); *B60G 2202/442* (2013.01); *B60G 2204/418* (2013.01); *B60G 2204/4191* (2013.01); *B60G 2800/012* (2013.01); *B60Y 2400/412* (2013.01)

(58) Field of Classification Search
   CPC ............ B60G 21/0555; B60G 21/0558; B60G 21/0553; B60G 17/0157; B60G 17/025; B60G 2202/42; B60G 2202/442
   See application file for complete search history.

(56) References Cited

U.S. PATENT DOCUMENTS

| | | | | |
|---|---|---|---|---|
| 6,022,030 A | * | 2/2000 | Fehring | B60G 21/0553 267/277 |
| 2008/0100019 A1 | * | 5/2008 | Simkovics | B60G 21/0555 280/124.107 |
| 2010/0324780 A1 | * | 12/2010 | Koumura | B60G 17/0165 701/38 |
| 2011/0037239 A1 | * | 2/2011 | Mori | B60G 21/0555 280/124.106 |
| 2013/0093152 A1 | * | 4/2013 | Berheide | B60G 21/04 280/124.106 |
| 2013/0291664 A1 | * | 11/2013 | Freund | B60G 21/0555 74/89 |
| 2015/0354669 A1 | * | 12/2015 | Ekoz | B60G 21/0555 475/331 |
| 2018/0272829 A1 | * | 9/2018 | Sim | B60G 21/0555 |

FOREIGN PATENT DOCUMENTS

WO   WO-2008049382 A1 *   5/2008   ......... B60G 21/0555

\* cited by examiner

*Primary Examiner* — Ruth Ilan
(74) *Attorney, Agent, or Firm* — Ladas & Parry, LLP (57) ABSTRACT

Disclosed is an active roll stabilizer. The active roll stabilizer includes a pair of stabilizer bars installed between wheels and an actuator connected between the pair of stabilizer bars and configured to deliver a rotational force to the pair of stabilizer bars, wherein the actuator includes a motor configured to generate the rotational force; a housing located between the pair of stabilizer bars and inside which the motor is disposed; and an engagement part installed between the housing and at least one of the pair of stabilizer bars and configured to screw-couple and fix one end portion of the at least one of the pair of stabilizer bars to one inner side of the housing.

19 Claims, 6 Drawing Sheets

ACTIVE ROLL STABILIZER

CROSS-REFERENCE TO RELATED APPLICATION

This application claims priority to and the benefit of Korean Patent Application No. 10-2016-0113239, filed on Sep. 2, 2016, and No. 10-2016-0113258, filed on Sep. 2, 2016, the disclosure of which is incorporated herein by reference in its entirety.

BACKGROUND

1. Field of the Invention

The present disclosure relates to an active roll stabilizer.

2. Discussion of Related Art

Generally, a stabilizer is often provided to improve stability of a vehicle body when a vehicle is turning or rolling.

The stabilizer may rotate a stabilizer bar, which is formed in a length direction of the stabilizer, by using an actuator when left and right wheels of the vehicle are vertically operated to generate a restoring force, thereby reducing an inclination of the vehicle body.

However, such a conventional stabilizer is electronically controlled by the actuator, and thus the stabilizer bar is often operated beyond a set maximum driving force when being rotated.

In such a case, since the stabilizer bar rotates with being distorted more than a rotational angle of a target value, stability of the vehicle body is lowered and also fixation and abrasion of the stabilizer are caused. Also, the actuator should even move in response to a weak vibration when the vehicle is driving down an unpaved road and a typical road.

SUMMARY OF THE INVENTION

Therefore, in accordance with one embodiment of the present disclosure, there is provided an active roll stabilizer capable of controlling a roll moment of a stabilizer bar connected to wheels to improve stability of a vehicle.

According to one aspect of the present disclosure, there is provided an active roll stabilizer including a pair of stabilizer bars installed between wheels; and an actuator connected between the pair of stabilizer bars and configured to deliver a rotational force to the pair of stabilizer bars, wherein the actuator includes a motor configured to generate the rotational force; a housing located between the pair of stabilizer bars and inside which the motor is disposed; and an engagement part installed between the housing and at least one of the pair of stabilizer bars and configured to screw-couple and fix one end portion of the at least one of the pair of stabilizer bars to one inner side of the housing.

At this point, the engagement part may include a bolt member screw-coupled to a screw groove, which is formed at the one end portion of the at least one of the pair of stabilizer bars, when the one end portion of the at least one of the pair of stabilizer bars is inserted into the housing.

At this point, the active roll stabilizer may further include a damping part rotatably coupled to the one inner side of the housing based on a rotating shaft of the motor, wherein one side of the damping part may be screw-coupled to the one end portion of the at least one of the pair of stabilizer bars by the engagement part, and the other side of the damping part may be connected to the motor to deliver the rotational force of the motor to the at least one of the pair of stabilizer bars.

At this point, the damping part may include a carrier disposed on an extending line of the rotating shaft of the motor inside the housing and having one side configured to support an inner surface of the housing; a coupler having one side coupled to the other side of the carrier and the other side screw-coupled to the at least one of the pair of stabilizer bars; and a damper disposed between the carrier and the coupler, coupled to the coupler to cover a portion of an outer surface of the coupler, and configured to absorb a vibration generated by the motor and the pair of stabilizer bars.

At this point, an engagement hole into which the bolt member is inserted may be formed at the coupler, and the bolt member may be screw-coupled to the screw groove of the at least one of the pair of stabilizer bars when inserted into the engagement hole.

At this point, the coupler may include a coupler body having a circular plate shape; a protrusion formed to protrude from one surface of the coupler body and coupled to the carrier; and an extension formed to extend from the other surface of the coupler body in a direction from the housing toward the at least one of the pair of stabilizer bars.

At this point, the engagement hole may include a first engagement hole formed at the coupler body, a second engagement hole formed at the protrusion, and a third engagement hole formed at the extension, and the first engagement hole, the second engagement hole, the third engagement hole may be formed on the extending line of the rotating shaft of the motor.

At this point, a diameter of the first engagement hole may be less than that of the second engagement hole such that an end portion of the bolt member may be in contact with and fixed by the first engagement hole.

At this point, the one end portion of the at least one of the pair of stabilizer bars may be screw-coupled to the third engagement hole by the bolt member when accommodated in the third engagement hole.

At this point, the active roll stabilizer may further include a first coupler in which a through-hole is formed on the extending line of the rotating shaft of the motor, connected to the at least one of the pair of stabilizer bars, and configured to rotatably couple the at least one of the pair of stabilizer bars to one end portion of the housing, wherein the at least one of the pair of stabilizer bars may be screw-coupled to the coupler when inserted into the through-hole.

At this point, the active roll stabilizer may further include a first tilting bearing installed between the at least one of the pair of stabilizer bars and the first coupler and configured to support the at least one of the pair of stabilizer bars and allow the at least one of the pair of stabilizer bars to be tilted.

At this point, the first coupler may include a first coupling body having a circular plate shape and coupled to one end of the housing; and a first coupling protrusion having a cylindrical shape and formed at a central portion of the first coupling body.

At this point, a sealing member configured to seal a first stabilizer bar may be installed on an inner circumferential surface of the first coupling protrusion.

At this point, the first tilting bearing may be installed between an outer circumferential surface of the first stabilizer bar and an inner circumferential surface of the first coupling protrusion.

At this point, the first coupling protrusion may be formed on one side surface of the first coupling body and may be formed to protrude in a direction from the housing toward the first stabilizer bar, and an axial length of the first coupling protrusion may be formed to be greater than that of the first tilting bearing.

At this point, one side surface of the first tilting bearing may be formed to be in contact with one side surface of the first coupling protrusion, and an end portion of the extension may be in contact with and supported by the first tilting bearing.

At this point, a bush may be installed between the housing and the damping part such that the damping part may be rotatably supported by the bush.

At this point, the active roll stabilizer may further include a second tilting bearing installed between the housing and the damping part and configured to support the damping part and allow the damping part to be rotatable inside the housing.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be fully described in detail which is suitable for easy implementation by those skilled in the art with reference to the accompanying drawings. The present disclosure may be implemented in various different forms, and thus the present disclosure is not limited to embodiments to be described herein. In the drawings, some portions not related to the description will be omitted and not be shown in order to clearly describe the present disclosure, and the same reference numerals are given to the same or similar components throughout the disclosure.

It should be understood that the terms "comprise" and "have" specify the presence of stated herein features, numbers, steps, operations, components, elements, or a combination thereof, but do not preclude the presence or possibility of an addition of one or more other features, numbers, steps, operations, components, elements, or a combination thereof.

Figure 1:
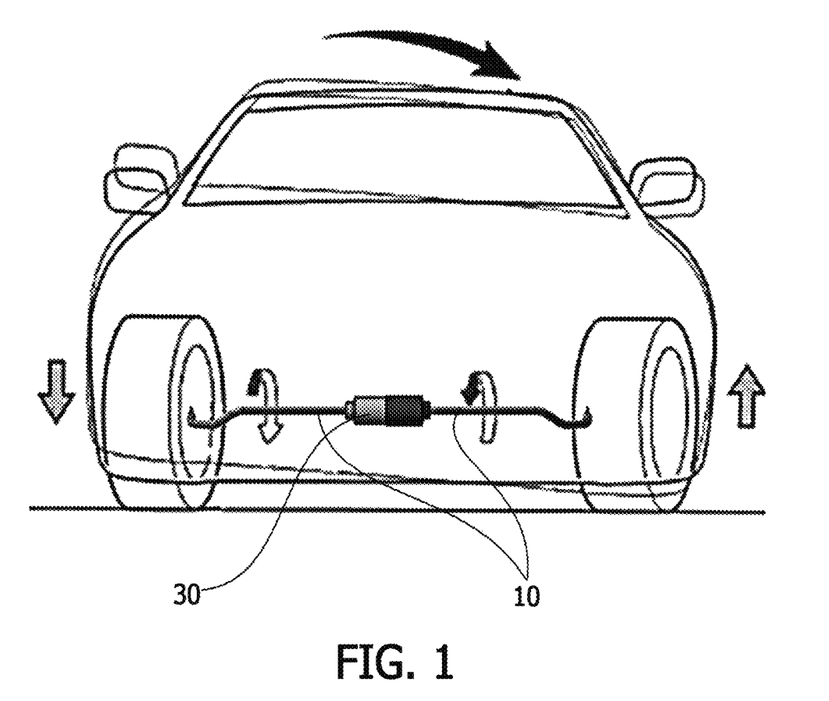
FIG. 1 is a schematic diagram illustrating a vehicle on which an active roll stabilizer according to one embodiment of the present disclosure is mounted.
Figure 2:
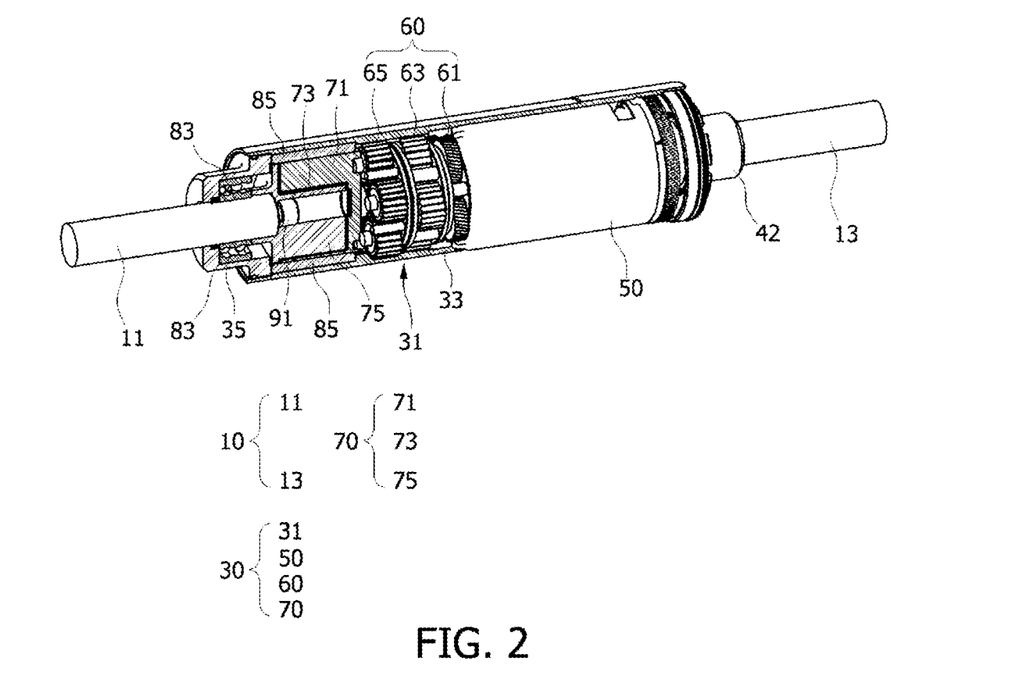
FIG. 2 is a perspective view illustrating the active roll stabilizer according to one embodiment of the present disclosure.
Figure 3:
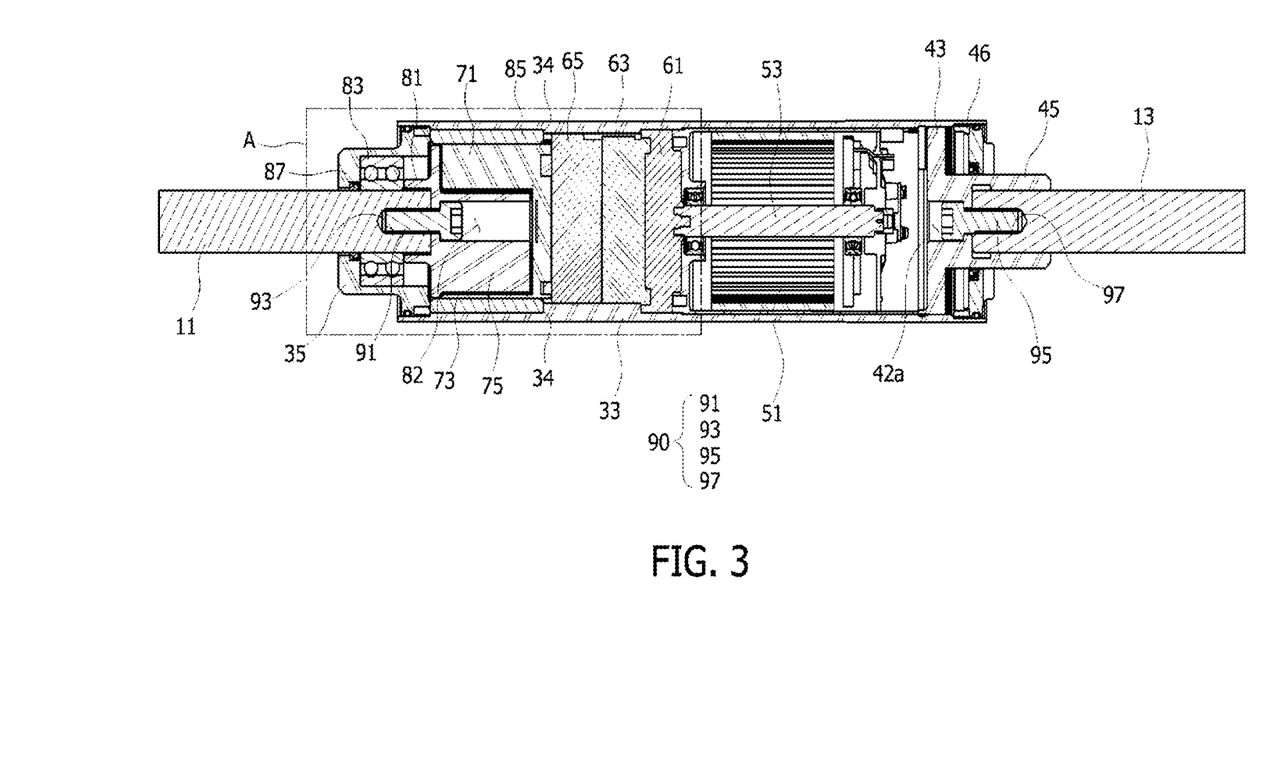
FIG. 3 is a cross-sectional view illustrating the active roll stabilizer according to one embodiment of the present disclosure.
Figure 4:
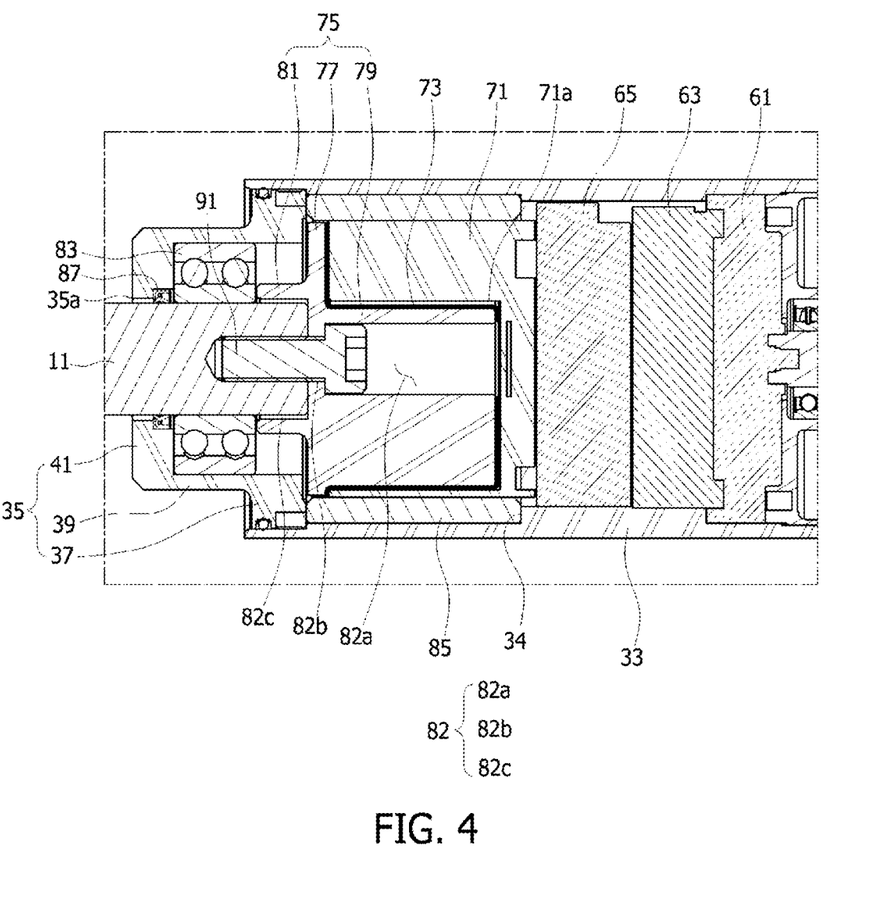
FIG. 4 is an enlarged view of Portion A of FIG. 3.

FIG. 1 is a schematic diagram illustrating a vehicle on which an active roll stabilizer according to one embodiment of the present disclosure is mounted. FIG. 2 is a perspective view illustrating the active roll stabilizer according to one embodiment of the present disclosure. FIG. 3 is a cross-sectional view illustrating the active roll stabilizer according to one embodiment of the present disclosure. FIG. 4 is an enlarged view of Portion A of FIG. 3.

In the following description, when viewed in FIG. 2, a side from a first stabilizer bar toward a second stabilizer bar is defined and described as a front side, and a side from the second stabilizer bar toward the first stabilizer bar is defined and described as a rear side.

Referring to FIG. 1, an active roll stabilizer 1 according to one embodiment of the present disclosure includes a stabilizer bar 10 and an actuator 30. The active roll stabilizer 1 according to one embodiment of the present disclosure may control a roll moment of the stabilizer bar 10, which is connected to wheels, to improve stability of a vehicle.

The active roll stabilizer 1 according to one embodiment of the present disclosure may be an electronic active roll stabilizer, but is not limited thereto. The active roll stabilizer 1 varies a roll angle in a turning section or a rotating section of the vehicle to improve stability of the vehicle.

Referring to FIG. 1, in one embodiment of the present disclosure, one end portion of each of a pair of stabilizer bars 10 may be installed between left and right wheels of the vehicle, and the other end portion of each thereof may be coupled to each of both sides of an actuator 30. In addition, the pair of stabilizer bars 10 control a rolling behavior of the vehicle while the vehicle is driven, and receives a rotational force from a motor 50 when the motor 50 is driven.

The active roll stabilizer 1 according to one embodiment of the present disclosure may control a posture of the vehicle by controlling a distortion moment of each of the pair of stabilizer bars 10 through the actuator 30 which is connected to each of the pair of stabilizer bars 10.

Referring to FIG. 2, in one embodiment of the present disclosure, the pair of stabilizer bars 10 may include a first stabilizer bar 11 and a second stabilizer bar 13. At this point, the first stabilizer bar 11 and the second stabilizer bar 13 may be each screw-coupled to both ends of a housing 31 through an engagement part 90 on an extending line of a rotating shaft of the motor 50.

Meanwhile, in one embodiment of the present disclosure, the engagement part 90 may be provided with a first bolt member 91, a second bolt member 95, a first screw groove 93 formed to be screw-coupled to the first bolt member 91, and a second screw groove 97 formed to be screw-coupled to the second bolt member 95.

At this point, the first screw groove 93 and the second screw groove 97 are respectively formed at one end of the first stabilizer bar 11 and one end of the second stabilizer bar 13, for example, as shown in FIG. 3, at a front side of the first stabilizer bar 11 and a rear side of the second stabilizer bar 13.

Meanwhile, the first stabilizer bar 11 is a rotating type stabilizer bar and may be rotatably coupled to one end of the housing 31, for example, to a rear end portion of the housing 31, as shown in FIG. 2, and the second stabilizer bar 13 is a fixed type stabilizer bar and may be fixed and coupled to the other end of the housing 31, for example, to a front end portion of the housing 31, as shown in FIG. 2.

Referring to FIG. 2, in one embodiment of the present disclosure, the actuator 30 is configured to control a distortion moment of each of the pair of stabilizer bars 10 and may include the housing 31, the motor 50, a planetary gear part 60, and a damping part 70.

Referring to FIG. 3, in one embodiment of the present disclosure, the housing 31 may include a housing body 33, a first coupler 35, and a second coupler 42. At this point, the housing body 33 may have a cylindrical shape, and a hollow portion may be formed in the housing body 33 to allow the motor 50, the planetary gear part 60, and the damping part 70 to be located inside the housing body 33. Also, in one embodiment of the present disclosure, the motor 50 may be fixed inside the housing body 33.

At this point, the motor 50 is driven when fixed to the housing body 33 such that the housing body 33 is rotated when the motor 50 is driven and a distortion moment may be generated.

In one embodiment of the present disclosure, at both end portions of the housing body 33, for example, the first coupler 35 may be coupled to a rear end portion of the housing body 33, and a second coupler 42 may be coupled to a front end portion of the housing body 33, as shown in FIG. 3.

At this point, the first stabilizer bar 11 may be rotatably coupled to the first coupler 35, and the second stabilizer bar 13 may be coupled and fixed to the second coupler 42.

Referring to FIG. 4, in one embodiment of the present disclosure, the first coupler 35 may include a first coupling body 37 and a first coupling protrusion 39. At this point, the first coupling body 37 may be formed in a circular plate shape, and the first coupling protrusion 39 may be formed in a cylindrical shape.

Further, the first coupling protrusion 39 may protrude from one side surface of the first coupling body 37, for example, in a backward direction at a central portion of the first coupling body 37, that is, in a direction from the housing body 33 toward the first stabilizer bar 11, as shown in FIG. 4.

At this point, in one embodiment of the present disclosure, a diameter of the first coupling body 37 may be greater than that of the first coupling protrusion 39, and thus the first coupling body 37 and the first coupling protrusion 39 may be formed to be stepped.

Meanwhile, in one embodiment of the present disclosure, the first coupler 35 may further include a first circular coupling plate 41. At this point, in one embodiment of the present disclosure, the first circular coupling plate 41 may be formed in a circular plate shape.

Also, the first circular coupling plate 41 may be coupled to an end portion of the first coupling protrusion 39. At this time, a sealing member 87 configured to seal the first stabilizer bar 11 may be installed at an inner circumference of the first coupling protrusion 39. That is, the sealing member 87 may be installed on an inner circumferential surface of the first circular coupling plate 41 to seal the first stabilizer bar 11.

Meanwhile, in one embodiment of the present disclosure, a first through-hole 35a is formed at a central portion of the first coupling body 37, the first coupling protrusion 39, and the first circular coupling plate 41 so that the first stabilizer bar 11 may be coupled to a coupler 75 when inserted into the first through-hole 35a.

Referring to FIG. 3, a first tilting bearing 83 may be installed between the first coupler 35 and the first stabilizer bar 11 to allow the first stabilizer bar 11 to be tilted and reduce resistance between the first coupler 35 and the first stabilizer bar 11, thereby increasing a lifetime of the active roll stabilizer 1 and reducing a noise and vibration thereof.

Referring to FIGS. 3 and 4, in one embodiment of the present disclosure, the first tilting bearing 83 may have a ring-shaped cross section and may be installed between an outer circumferential surface of the first stabilizer bar 11 and an inner circumferential surface of the first coupling protrusion 39 to allow the first stabilizer bar 11 to be rotatable.

At this point, in one embodiment of the present disclosure, an axial length of the first coupling protrusion 39 is formed to be greater than that of the first tilting bearing 83 such that the first tilting bearing 83 may be seated inside the first coupler 35.

Also, in one embodiment of the present disclosure, one side surface of the first tilting bearing 83, for example, a front surface of the first tilting bearing 83, is formed to be in contact with a rear surface of the first circular coupling plate 41, as shown in FIG. 3, such that the first tilting bearing 83 may be supported by the first circular coupling plate 41.

Meanwhile, in the embodiment of the present disclosure, the first tilting bearing 83 may be a double row bearing or an angular bearing, but the first tilting bearing 83 is not limited thereto as long as it is a bearing that is not capable of absorbing a tilting moment. Also, a tilting moment is not absorbed in the first tilting bearing 83.

That is, the first tilting bearing 83 may allow a tilting operation of the first stabilizer bar 11 and may prevent or minimize abrasion of the first stabilizer bar 11 when the first stabilizer bar 11 is tilted.

Referring to FIG. 3, in one embodiment of the present disclosure, the second coupler 42 may include a second coupling body 43 and a second coupling protrusion 45. At this point, the second coupling body 43 may be formed in a circular plate shape, and the second coupling protrusion 45 may be formed in a cylindrical shape.

In addition, the second coupling protrusion 45 may protrude from one side surface of the second coupling body 43, for example, may be formed to protrude from a front surface of the second coupling body 43, as shown in FIG. 3. At this point, a diameter of the second coupling body 43 may be greater than that of the second coupling protrusion 45, and thus the second coupling body 43 and the second coupling protrusion 45 may be formed to be stepped.

Meanwhile, in one embodiment of the present disclosure, a second through-hole 42a is formed at a central portion of the second coupling body 43 and the second coupling protrusion 45, and the second through-hole 42a is formed to be stepped inside the second coupling body 43 such that a rear end portion of the second bolt member 95 may be in contact with and supported by the step.

At this point, the second stabilizer bar 13 may be coupled to the second coupling body 43 when inserted into the second through-hole 42a. That is, the second bolt member 95 is screw-coupled to the second screw groove 97 of the second stabilizer bar 13 when inserted into the second through-hole 42a such that the second stabilizer bar 13 may be fixed to the second coupling body 43.

Further, in one embodiment of the present disclosure, a fixing member 46 may have a ring-shaped cross section, and a fixing hole (not shown) may be formed at a central portion of the fixing member 46. At this point, when the second coupling protrusion 45 is inserted into the fixing hole, the fixing member 46 may be coupled to the front end portion of the housing body 33.

In one embodiment of the present disclosure, the fixing member 46 may be coupled to the front end portion of the housing body 33 to seal a gap that is formed resulting from a coupling between the second stabilizer bar 13 and the second coupling body 43.

Meanwhile, as shown in FIG. 2, the motor 50 may be installed at the front end portion of the housing body 33 and may be located between the second stabilizer bar 13 and the planetary gear part 60 inside the housing body 33.

At this point, in one embodiment of the present disclosure, the motor 50 may include a stator 51 configured to generate a magnetic force when power is applied thereto and a rotor 53 configured to be rotated by the magnetic force generated by the stator 51.

Also, a connecting hole (not shown) may be formed at the front end portion of the housing body 33 such that a wire (not shown), through which power is applied to the motor 50, is connected to the outside. At this point, the wire may be connected to an external power source through the connecting hole. In addition, a waterproof rubber cover (not shown) may be installed between the connecting hole and the wire to protect the wire.

Referring to FIG. 3, the planetary gear part 60 may be located inside the housing body 33 and may include a sun gear (not shown) and a planetary gear (not shown). Also, the planetary gear part 60 may deliver a rotational force of the motor 50 to the damping part 70 between the motor 50 and the damping part 70. At this point, the planetary gear part 60 may include a first stage speed reducer 61, a second stage speed reducer 63, and a third stage speed reducer 65 which have increasing gear ratios as a gear stage increases.

Further, a protruding member (not shown) may be formed at a central portion of each of the first stage speed reducer 61, the second stage speed reducer 63, and the third stage speed reducer 65 to connect each of the gear stages. At this point, a bearing member (not shown) is installed at the protruding member to support the sun gear such that rotation about an axial direction may be firmly performed.

Meanwhile, referring to FIG. 3, the damping part 70 may include a carrier 71, a damper 73, and the coupler 75. At this point, the damping part 70 may be coupled to the planetary gear part 60 and may output the rotational force generated by the motor 50 to operate the first stabilizer bar 11.

In one embodiment of the present disclosure, the damping part 70 is located between the planetary gear part 60 and the first stabilizer bar 11 inside the housing body 33. Further, a bush 85 is installed between the housing body 33 and the damping part 70 such that the damping part 70 may be rotatably supported by the bush 85 inside the housing body 33.

At this point, in one embodiment of the present disclosure, the bush 85 may have a ring-shaped cross section and may be fixed by a hook protrusion 34 which is formed to be stepped on an inner surface of the housing body 33.

Referring to FIGS. 2 and 3, in one embodiment of the present disclosure, the carrier 71 may have a cylindrical shape that is rotatable in one direction, and a coupling recess 71a may be formed at one surface, for example, at a front surface of the carrier 71, as shown in FIG. 3.

In one embodiment of the present disclosure, the planetary gear part 60 is rotatably coupled to a rear side of the carrier 71 based on the rotating shaft of the motor 50, and the damper 73 and the coupler 75 are coupled to a front side of the carrier 71 such that the rotational force from the motor 50 may be delivered to the coupler 75 via the planetary gear part 60 and the damper 73.

At this point, referring to FIG. 3, in one embodiment of the present disclosure, the bush 85 is installed between the carrier 71 and the housing body 33 such that the carrier 71 may be in contact with the bush 85 to be rotatably supported inside the housing body 33. At this point, the bush 85 may support the carrier 71 to be rotated in the axial direction, and also the bush 85 may not be installed inside the housing 31.

Meanwhile, in one embodiment of the present disclosure, the damper 73 may be formed to correspond to a shape of the coupling recess 71a and may be coupled between the carrier 71 and the coupler 75, which are located at the front end portion of the housing body 33, to reduce an impact torque and improve a ride comfort.

Referring to FIG. 3, the coupler 75 may be disposed on the extending line of the rotating shaft of the motor 50 inside the housing body 33 and may be coupled to be rotatable around the rotating shaft of the motor 50.

Meanwhile, in one embodiment of the present disclosure, a front end portion of the coupler 75 may be screw-coupled to the first screw groove 93 which is formed at a rear end portion of the first stabilizer bar 11 via the first bolt member 91 when the first stabilizer bar 11 is inserted into the first through-hole 35a.

In addition, a rear end portion of the coupler 75 may be connected to the motor 50 to deliver the rotational force of the motor 50 to the first stabilizer bar 11. At this point, the coupler 75 delivers a torque from the carrier 71 via the damper 73 to the first stabilizer bar 11.

Referring to FIG. 3, in one embodiment of the present disclosure, the coupler 75 may include a coupler body 77, an extension 81, and a protrusion 79, and each of the coupler body 77, the extension 81, and the protrusion 79 may be coupled to the first stabilizer bar 11 and the carrier 71.

At this point, in one embodiment of the present disclosure, an engagement hole 82 may be formed at a central portion of each of the coupler body 77, the extension 81, and the protrusion 79, and the engagement hole 82 may be provided with a first engagement hole 82a, a second engagement hole 82b, and a third engagement hole 82c.

Referring to FIGS. 3 and 4, in one embodiment of the present disclosure, the coupler body 77 has a ring shape, and both end portions of the coupler body 77 are in contact with the bush 85 installed inside the housing body 33 such that the coupler body 77 may be rotatably supported inside the housing body 33.

Also, in one embodiment of the present disclosure, at least a portion of a front end surface of the coupler body 77 is in contact with a rear end surface of the first coupling body 37 such that the coupler body 77 may be supported thereby. Further, the first engagement hole 82a may be formed at the central portion of the coupler body 77.

Meanwhile, the forwardly protruding extension 81 may be formed at a one end portion of the coupler body 77, for example, at a front surface of the coupler body 77, as shown in FIG. 3. That is, the extension 81 may be formed to extend in a direction from the housing body 33 toward the first stabilizer bar 11.

Meanwhile, in one embodiment of the present disclosure, the extension 81 may be configured in a cylindrical shape, and the third engagement hole 82c may be formed at a central portion of the extension 81. At this point, the rear end portion of the first stabilizer bar 11 may be screw-coupled to the coupler body 77 by the first bolt member 91 when accommodated in the third engagement hole 82c of the cylindrically-shaped extension 81.

Also, in one embodiment of the present disclosure, a front end portion of the extension 81 may be in contact with a rear surface of the first tilting bearing 83 to support the first tilting bearing 83.

The downwardly protruding protrusion 79 may be formed at the other end portion of the coupler body 77, for example, at a rear surface of the coupler body 77, as shown in FIG. 3. That is, the protrusion 79 may be formed to protrude in a direction from the housing body 33 toward the second stabilizer bar 13.

At this point, in one embodiment of the present disclosure, the second engagement hole 82b may be formed at a central portion of the protrusion 79. At this point, the first stabilizer bar 11 may be screw-coupled to the coupler body 77 by the first bolt member 91 when the first bolt member 91 is inserted into the second engagement hole 82*b*.

That is, referring to FIG. 3, when the first bolt member 91 is inserted into the second engagement hole 82*b* and the first engagement hole 82*a* through a rear end portion of the protrusion 79 and the first stabilizer bar 11 is inserted into the third engagement hole 82*c* through the front end portion of the extension 81, the first bolt member 91 may be screw-coupled to the first screw groove 93 which is formed at the first stabilizer bar 11.

At this point, in one embodiment of the present disclosure, the first engagement hole 82*a*, the second engagement hole 82*b*, and the third engagement hole 82*c* may be formed on the extending line of the rotating shaft of the motor 50. Also, a diameter of the first engagement hole 82*a* is greater than that of the second engagement hole 82*b* such that a rear end portion of the first bolt member 91 may be in contact with and fixed by the first engagement hole 82*a*.

Meanwhile, in one embodiment of the present disclosure, the protrusion 79 may be connected to the damper 73 to be coupled to the carrier 71, and the protrusion 79 may be formed to correspond to the coupling recess 71*a* to be fitted in and coupled to the coupling recess 71*a* of the carrier 71.

Referring to FIG. 2, in one embodiment of the present disclosure, the motor 50, the planetary gear part 60, and the damping part 70 may be sequentially installed from the front end portion to the rear end portion of the housing body 33 inside the housing 31, but the present disclosure is not limited thereto, and the damping part 70, the motor 50, and the planetary gear part 60 may be sequentially installed.

Figure 5:
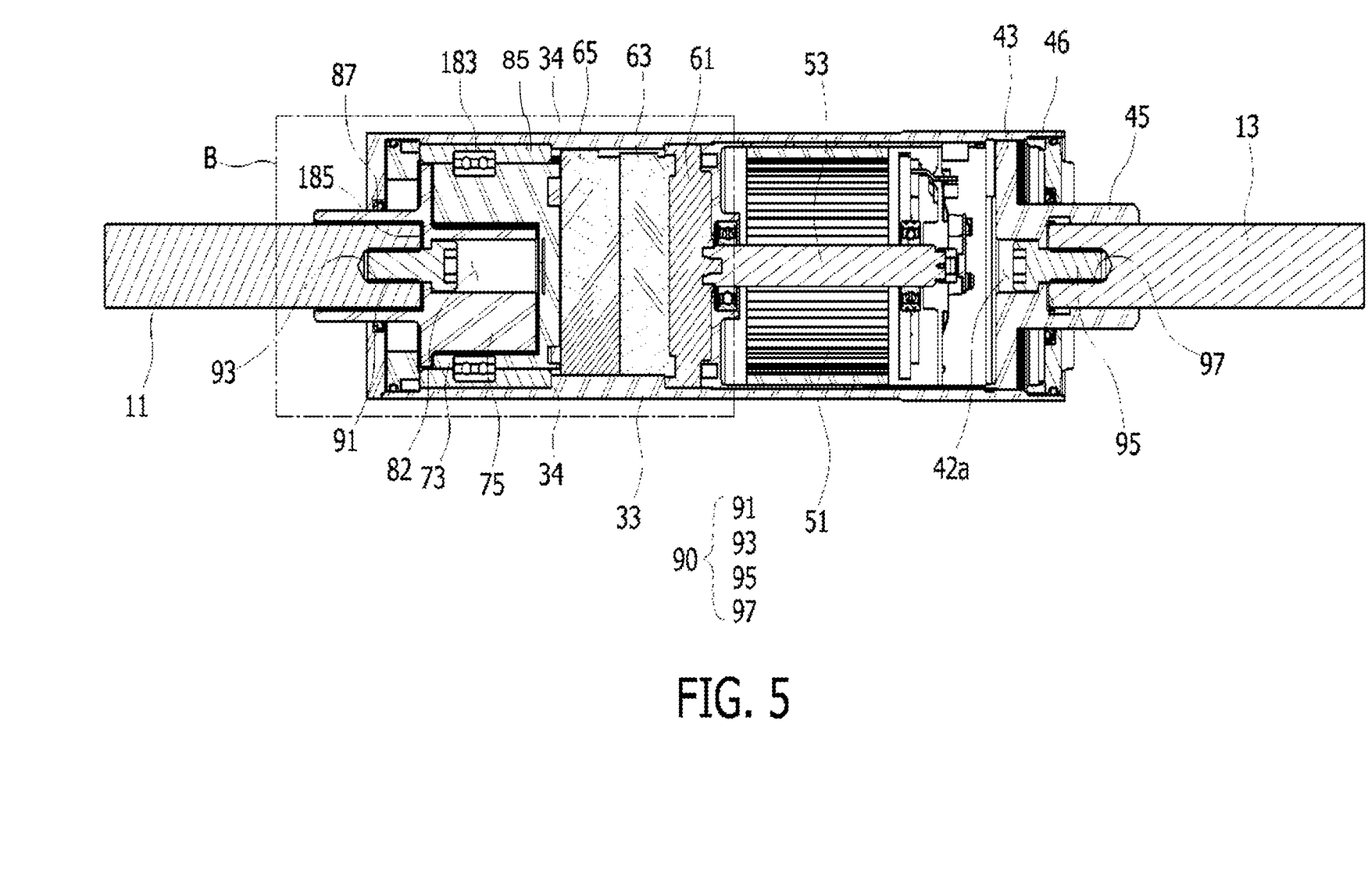
FIG. 5 is a cross-sectional view illustrating a modified embodiment of the active roll stabilizer according to one embodiment of the present disclosure.
Figure 6:
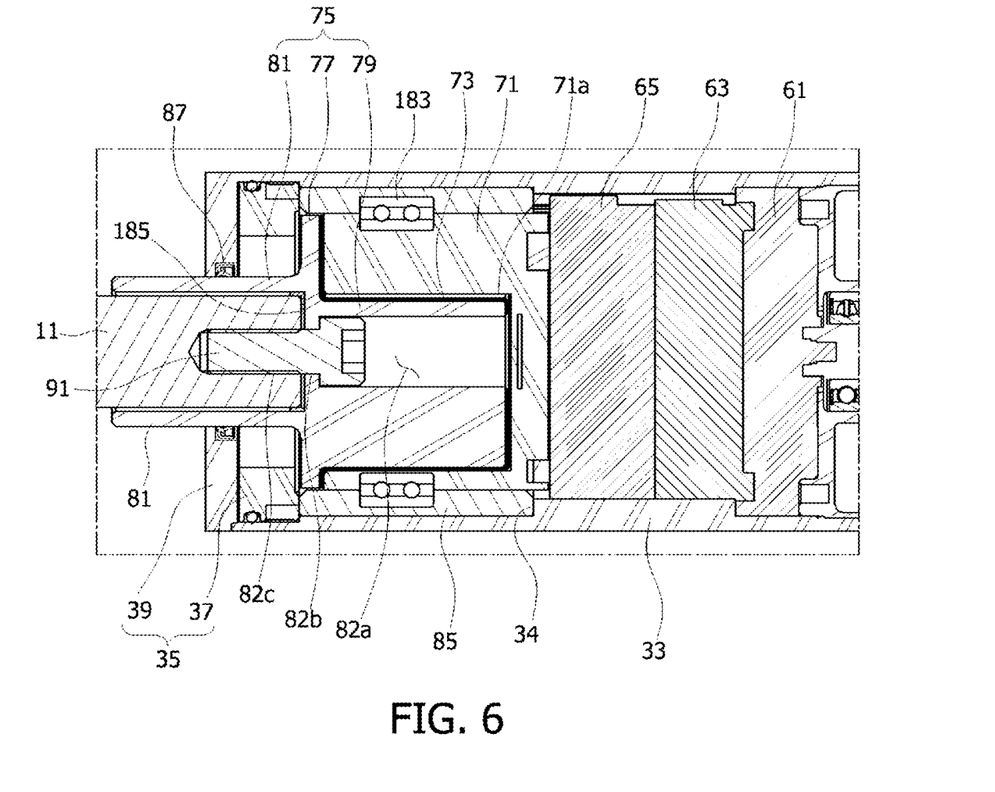
FIG. 6 is an enlarged view of Portion B of FIG. 5.

FIG. 5 is a cross-sectional view illustrating a modified embodiment of the active roll stabilizer according to one embodiment of the present disclosure. FIG. 6 is an enlarged view of Portion B of FIG. 5.

Referring to FIGS. 5 and 6, in one embodiment of the present disclosure, a second tilting bearing 183 is installed between the housing 31 and the damping part 70, and thus the damping part 70 may be tilted and resistance between the housing 31 and the damping part 70 may be reduced such that the lifetime of the active roll stabilizer 1 may be increased and a noise and vibration thereof may be reduced.

In one embodiment of the present disclosure, the second tilting bearing 183 may have a ring-shaped cross section, and the damping part 70 may be rotatably installed between an outer circumferential surface of the carrier 71, which is the damping part 70, and an inner circumferential surface of the housing body 33.

At this point, in one embodiment of the present disclosure, the second tilting bearing 183 may be a double row bearing or an angular bearing, but the second tilting bearing 183 is not limited thereto as long as it is a bearing that is not capable of absorbing a tilting moment.

Meanwhile, in one embodiment of the present disclosure, a packing plate 185 is installed between the carrier 71 and the extension 81 coupled to the first stabilizer bar 11 such that a flow of external foreign materials into the housing body 33 may be prevented.

Referring to FIGS. 5 and 6, in one embodiment of the present disclosure, the coupler 75 may include the coupler body 77, the extension 81, and the protrusion 79, and each of the coupler body 77, the extension 81, and the protrusion 79 may be coupled to the first stabilizer bar 11 and the carrier 71.

At this point, in one embodiment of the present disclosure, the engagement hole 82 may be formed at a central portion of each of the coupler body 77, the extension 81, and the protrusion 79, and the engagement hole 82 may be provided with the first engagement hole 82*a*, the second engagement hole 82*b*, and the third engagement hole 82*c*.

Meanwhile, in one embodiment of the present disclosure, the extension 81 may be configured in a cylindrical shape, and the third engagement hole 82*c* may be formed at the central portion of the extension 81. At this point, the rear end portion of the first stabilizer bar 11 may be screw-coupled to the coupler body 77 by the first bolt member 91 when accommodated in the third engagement hole 82*c* of the cylindrically-shaped extension 81.

Further, referring to FIG. 6, in one embodiment of the present disclosure, the first coupler 35 may include the first coupling body 37 and the first coupling protrusion 39. At this point, the first coupling body 37 may be formed in a circular plate shape, and the first coupling protrusion 39 may be formed in a cylindrical shape. At this time, the sealing member 87 configured to seal the first stabilizer bar 11 may be installed at the inner circumference of the first coupling protrusion 39. Also, the first coupling protrusion 39 may be coupled to the extension 81.

In a modified embodiment of the present disclosure, a configuration except for the second tilting bearing 183 and the packing plate 185, which are described above, is the same as the above-described configuration, and thus a description thereof will be omitted.

Meanwhile, the active roll stabilizer 1 according to one embodiment of the present disclosure have the motor 50, the planetary gear part 60, and the damping part 70 which are installed therein, but the active roll stabilizer 1 may be installed with various devices configured to be used in an operation of the electronic active roll stabilizer in addition to the motor 50, the planetary gear part 60, and the damping part 70.

These devices are known in an electronic active roll stabilizer, and descriptions thereof will be omitted.

The active roll stabilizer according to one embodiment of the present disclosure may be formed such that the stabilizer bar can be coupled by the engagement part inside the housing, which surrounds the motor, to be easily fixed inside the housing. Accordingly, in accordance with the active roll stabilizer according to one embodiment of the present disclosure, assemblability of the active roll stabilizer can be improved and the stabilizer bar can be easily assembled therein.

The active roll stabilizer according to one embodiment of the present disclosure is formed such that the first stabilizer bar or the damping part can be supported by the tilting bearing inside the housing, which surrounds the motor, to be supported inside the housing while the first stabilizer bar or the damping part is tilted. Accordingly, resistance between the first stabilizer bar and the housing and between the damping part and the housing can be reduced to increase the lifetime of the active roll stabilizer and reduce a noise and vibration thereof.

The active roll stabilizer according to one embodiment of the present disclosure can control a distortion moment of the stabilizer bar through the actuator connected thereto, thereby controlling a posture of a vehicle.

Although one embodiment of the present disclosure has been described, the spirit of the present disclosure is not limited to the embodiment disclosed herein, and it should be understood that numerous other embodiments can be devised by those skilled in the art that will fall within the same spirit and scope of this disclosure through addition, modification, deletion, supplementation, and the like of a component.

What is claimed is:

1. An active roll stabilizer comprising:
a pair of stabilizer bars installed between wheels; and
an actuator connected between the pair of stabilizer bars and configured to deliver a rotational force to the pair of stabilizer bars,
wherein the actuator includes:
a motor configured to generate the rotational force;
a housing located between the pair of stabilizer bars and inside which the motor is disposed;
an engagement part installed between the housing and at least one of the pair of stabilizer bars and configured to screw-couple and fix one end portion of the at least one of the pair of stabilizer bars to one inner side of the housing; and
a damping part rotatably supported by the one inner side of the housing, wherein one side of the damping part is screw-coupled to the one end portion of the at least one of the pair of stabilizer bars by the engagement part, and an other side of the damping part is connected to the motor to deliver the rotational force of the motor to the at least one of the pair of stabilizer bars.

2. The active roll stabilizer of claim 1, wherein the engagement part includes a bolt member screw-coupled to a screw groove, which is formed at the one end portion of the at least one of the pair of stabilizer bars.

3. The active roll stabilizer of claim 1, wherein the damping part includes:
a carrier disposed on an extending line of the rotating shaft of the motor inside the housing and having one side configured to support an inner surface of the housing;
a coupler having one side coupled to the other side of the carrier and the other side screw-coupled to the at least one of the pair of stabilizer bars; and
a damper disposed between the carrier and the coupler, coupled to the coupler to cover a portion of an outer surface of the coupler, and configured to absorb a vibration generated by the motor and the pair of stabilizer bars.

4. The active roll stabilizer of claim 3, wherein:
an engagement hole into which the bolt member is inserted is formed at the coupler, and
the bolt member is screw-coupled to the screw groove of the at least one of the pair of stabilizer bars when inserted into the engagement hole.

5. The active roll stabilizer of claim 4, wherein the coupler includes:
a coupler body having a circular plate shape;
a protrusion formed to protrude from one surface of the coupler body and coupled to the carrier; and
an extension formed to extend from the other surface of the coupler body in a direction from the housing toward the at least one of the pair of stabilizer bars.

6. The active roll stabilizer of claim 5, wherein the engagement hole includes a first engagement hole formed at the coupler body, a second engagement hole formed at the protrusion, and a third engagement hole formed at the extension, and the first engagement hole, the second engagement hole, the third engagement hole are formed on the extending line of the rotating shaft of the motor.

7. The active roll stabilizer of claim 6, wherein a diameter of the first engagement hole is less than that of the second engagement hole such that an end portion of the bolt member is in contact with and fixed by the first engagement hole.

8. The active roll stabilizer of claim 6, wherein the one end portion of the at least one of the pair of stabilizer bars is screw-coupled to the third engagement hole by the bolt member when accommodated in the third engagement hole.

9. The active roll stabilizer of claim 5, further comprising a first coupler in which a through-hole is formed on the extending line of the rotating shaft of the motor, connected to the at least one of the pair of stabilizer bars, and configured to rotatably couple the at least one of the pair of stabilizer bars to one end portion of the housing,
wherein the at least one of the pair of stabilizer bars is screw-coupled to the coupler when inserted into the through-hole.

10. The active roll stabilizer of claim 9, further comprising a tilting bearing installed between the at least one of the pair of stabilizer bars and the first coupler and configured to support the at least one of the pair of stabilizer bars and allow the at least one of the pair of stabilizer bars to be tilted.

11. The active roll stabilizer of claim 10, wherein the first coupler includes:
a first coupling body having a circular plate shape and coupled to one end of the housing; and
a first coupling protrusion having a cylindrical shape and formed at a central portion of the first coupling body.

12. The active roll stabilizer of claim 11, wherein a sealing member configured to seal a first stabilizer bar is installed on an inner circumferential surface of the first coupling protrusion.

13. The active roll stabilizer of claim 12, wherein the tilting bearing is installed between an outer circumferential surface of the first stabilizer bar and an inner circumferential surface of the first coupling protrusion.

14. The active roll stabilizer of claim 13, wherein:
the first coupling protrusion is formed on one side surface of the first coupling body and is formed to protrude in a direction from the housing toward the first stabilizer bar, and
an axial length of the first coupling protrusion is formed to be greater than that of the tilting bearing.

15. The active roll stabilizer of claim 13, wherein one side surface of the tilting bearing is formed to be in contact with one side surface of the first coupling protrusion, and an end portion of the extension is in contact with and supported by the tilting bearing.

16. The active roll stabilizer of claim 10, wherein a bush is installed between the housing and the damping part such that the damping part is rotatably supported by the bush.

17. The active roll stabilizer of claim 9, further comprising a tilting bearing installed between the housing and the damping part and configured to support the damping part and allow the damping part to be rotatable inside the housing.

18. An active roll stabilizer comprising:
a pair of stabilizer bars installed between wheels; and
an actuator connected between the pair of stabilizer bars and configured to deliver a rotational force to the pair of stabilizer bars,
wherein the actuator includes:
a motor configured to generate the rotational force;
a housing located between the pair of stabilizer bars and inside which the motor is disposed;
an engagement part installed between the housing and at least one of the pair of stabilizer bars and configured to screw-couple and fix one end portion of the at least one of the pair of stabilizer bars to one inner side of the housing; and a damping part includes a carrier disposed on an extending line of a rotating shaft of the motor inside the housing and having one side configured to support an inner surface of the housing, a coupler having one side coupled to an other side of the carrier and an other side screw-coupled to the at least one of the pair of stabilizer bars, and a damper disposed between the carrier and the coupler, coupled to the coupler to cover a portion of an outer surface of the coupler, and configured to absorb a vibration generated by the motor and the pair of stabilizer bars.

19. The active roll stabilizer of claim 18, wherein:

an engagement hole into which the bolt member is inserted is formed at the coupler, and the bolt member is screw-coupled to the screw groove of the at least one of the pair of stabilizer bars when inserted into the engagement hole.

* * * * *